(12) United States Patent
Hua et al.

(10) Patent No.: US 12,474,980 B2
(45) Date of Patent: Nov. 18, 2025

(54) SYSTEMS, METHODS, AND DEVICES FOR IMPROVED APPLICATION PROGRAM INTERFACE MANAGEMENT IN A CLOUD-COMPUTING ENVIRONMENT

(71) Applicant: Salesforce, Inc., San Francisco, CA (US)

(72) Inventors: Jimmy Hua, San Francisco, CA (US); Sai Lakshminaraayana, San Francisco, CA (US); Chong Pang, Union City, CA (US); Hardik Patel, Frisco, TX (US); Jaisudha Gunasekaran, San Jose, CA (US); Jialin Chen, San Francisco, CA (US); Tariq Arghastani, San Francisco, CA (US); Frédéric Voituret, Santa Barbara, CA (US); Gang Shu, San Francisco, CA (US); Evan Callahan, Clinton, WA (US); Sameer Singhvi, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 479 days.

(21) Appl. No.: 18/161,650

(22) Filed: Jan. 30, 2023

(65) Prior Publication Data
US 2024/0256367 A1   Aug. 1, 2024

(51) Int. Cl.
G06F 9/54        (2006.01)

(52) U.S. Cl.
CPC .............. G06F 9/543 (2013.01); G06F 9/542 (2013.01)

(58) Field of Classification Search
CPC . G06F 9/54; G06F 9/541; G06F 9/542; G06F 16/1734
See application file for complete search history.

(56) References Cited

U.S. PATENT DOCUMENTS

| | | | |
|---|---|---|---|
| 8,973,106 B2 | 3/2015 | Warshavsky et al. | |
| 9,628,493 B2 | 4/2017 | Warshavsky et al. | |
| 9,710,127 B2 | 7/2017 | Torman et al. | |
| 10,102,133 B2* | 10/2018 | Pack, III | G06F 12/128 |
| 10,387,439 B2 | 8/2019 | Vasudev et al. | |
| 10,447,737 B2 | 10/2019 | Hua et al. | |
| 10,515,013 B2 | 12/2019 | Hua et al. | |
| 10,742,714 B2 | 8/2020 | Singhvi et al. | |

(Continued)

Primary Examiner — Andy Ho
(74) Attorney, Agent, or Firm — Polygon IP, LLP

(57) ABSTRACT

Systems, methods, and devices are disclosed herein that provide management of usage of application program interfaces. A computing platform may be configurable to cause detecting a first action comprising an event at a user interface associated with an on-demand application hosted by the computing platform, and making, using a first application program interface (API), an asynchronous call for a data record in response to detecting the first action, the asynchronous call being made to a storage location of the computing platform. The computing platform may also be configurable to cause detecting a second action associated with the on-demand application, and determining if a synchronous call should be performed using a second API, the synchronous call being made in response to determining that a cache does not include the data record. The computing platform may also be configurable to cause generating a result responsive to the second action.

20 Claims, 9 Drawing Sheets

(56) References Cited

U.S. PATENT DOCUMENTS

| | | |
|---|---|---|
| 11,010,272 B2 | 5/2021 | Bastianelli et al. |
| 11,010,481 B2 | 5/2021 | Bastianelli et al. |
| 2015/0106736 A1 | 4/2015 | Torman et al. |
| 2017/0337391 A1 | 11/2017 | Chang et al. |
| 2022/0247724 A1 | 8/2022 | Shu et al. |
| 2022/0269801 A1 | 8/2022 | Hua et al. |
| 2022/0318423 A1 | 10/2022 | Shu et al. |

* cited by examiner

SYSTEMS, METHODS, AND DEVICES FOR IMPROVED APPLICATION PROGRAM INTERFACE MANAGEMENT IN A CLOUD-COMPUTING ENVIRONMENT

FIELD OF TECHNOLOGY

This patent document relates generally to computing platforms, and more specifically to usage of synchronous and asynchronous application program interfaces with cloud-based computing platforms.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks. Cloud computing services may be hosted by computing platforms and may be implemented to provide a variety of on-demand services to users. Accordingly, users may interact with applications and websites associated with such on-demand services, and data objects may be requested and retrieved as a result of such interactions. Conventional techniques for retrieving such data objects remain limited because they are not able to efficiently handle the numerous data retrieval operations that may be associated with such on-demand service interactions.

BRIEF DESCRIPTION OF THE DRAWINGS

The included drawings are for illustrative purposes and serve only to provide examples of possible structures and operations for the disclosed inventive systems, apparatus, methods and computer program products for application program interface management in computing platforms. These drawings in no way limit any changes in form and detail that may be made by one skilled in the art without departing from the spirit and scope of the disclosed implementations.

DETAILED DESCRIPTION

Figure 1:
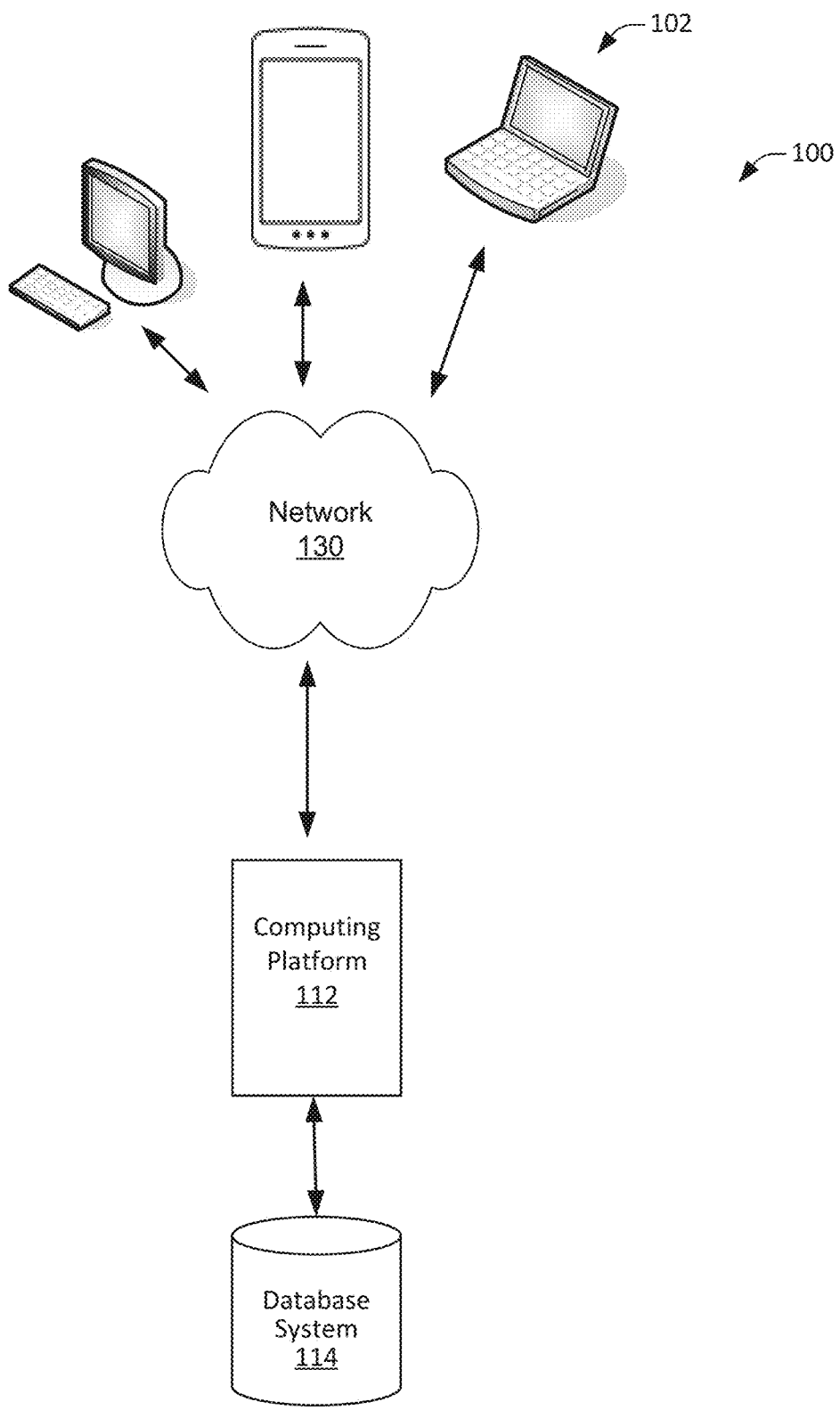
FIG. 1 illustrates an example of an arrangement of components in a computing platform system, configured in accordance with one or more implementations.

On-demand services provided by computing platforms may be used to support various functionalities for applications and websites. As will be discussed in greater detail below, such on-demand services may be provided to guide a user through a particular process flow, and manage the retrieval and display of data during such a process flow. For example, a user being guided through a online purchasing transaction may be guided through a process flow that includes different steps of logging into an account, being provided with account information, being provided with product information, being provided with product quotes, as well as an additional flow for actually purchasing a product that may include entry of payment information among other information. Conventional techniques may utilize synchronous calls responsive to each step of such process flows. When implemented in this serial manner, the amount of time required to implement such synchronous calls may become overly burdensome and result in relatively high latencies experienced by the user.

Various implementations disclosed herein provide the ability to utilize a controller and associated application program interface (API) in tandem with a process flow associated with a user to intelligently retrieve and cache information that may subsequently be used by the user in the context of that process flow. As will be discussed in greater detail below, an asynchronous controller may be used to make asynchronous calls based on particular events detected that may be associated with user actions within the context of that process flow. The asynchronous calls may be used to cache data, thus making the data available from a low-latency storage location for subsequent user actions within the process flow. Moreover, as will be discussed in greater detail below, a second controller and associated API may also be used to perform additional data retrieval operations. For example, the second controller and API may be configured to perform synchronous calls for specific data objects when appropriate. Accordingly, implementations disclosed herein leverage multiple APIs in tandem with a user's process flow to reduce a latency experience by the user, as may occur when only synchronous calls are made in a serial manner.

In one example, an event may be occurring where guests scan a QR code to check in. Accordingly, a guest may arrive and have a QR code scanned that causes the loading of a website and user interface to check in for the event. In this example, multiple guests may be checking in for the event, and thus using the same or similar data for their check ins. Accordingly, the initial guest check in may trigger an asynchronous call to pre-fetch and cache data objects such as an interactive map of the event venue, information about the event itself, pictures or other visual data objects about the event, as well as one or more messages and/or chat room communications that the guest may interact with. Such information may be cached so that subsequent guests that check in are provided with this information during their check in from the cached location and with a lower latency. Moreover, as will be discussed in greater detail below, asynchronous and synchronous APIs may be leveraged to handle such pre-fetching and caching.

FIG. 1 illustrates an example of an arrangement of components in a computing platform system, configured in accordance with one or more implementations. As will be discussed in greater detail below, a system, such as system 100, may be implemented to manage the usage of APIs used to identify and retrieve content that may be used by an end user of an application, such as one used with an on-demand service. As will be discussed in greater detail below, APIs may be configured to utilize asynchronous and synchronous calls when appropriate to enhance and improve latencies associated with content retrieval for an application process flow. As will be discussed in greater detail below, in some implementations, asynchronous calls may be used to pre-emptively retrieve data objects, and synchronous calls may be used to retrieve requested data objects not captured by the asynchronous calls.

System 100 includes one or more client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. A user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application. Moreover, such user interfaces may be used to access on-demand services and software applications, as will be discussed in greater detail below.

In various implementations, system 100 further includes one or more servers configured to provide a computing platform, such as computing platform 112, and various client devices may be communicatively coupled to computing platform 112. In various implementations, computing platform 112 is configured to include software and hardware that provides an environment for the execution of an application. As will be discussed in greater detail below, computing platform 112 may include components configured to implement a service layer and a data layer associated with one or more hosted applications.

More specifically, computing platform 112 may include one or more processors and memory configured execute components of a software application. As will be discussed in greater detail below, computing platform 112 may be configured to implement one or more controllers used to control APIs as well as associated data storage locations. In this way, computing platform 112 includes components configured to manage asynchronous and synchronous calls as disclosed herein and discussed in greater detail below. In some implementations, computing platform 112 may also be configured to store program code and settings for a particular application, and may also be configured to execute the code.

Computing platform 112 may be in communication with numerous client devices and may implement the application in a distributed manner. In some implementations, computing platform 112 is further configured to generate and serve webpages that may be viewed by a user via one or more devices, such as client machine 102. Accordingly, computing platform 112 is configured to provide a web-based interface between a user of client machine 102 and an application that is deployed in a distributed environment. In some implementations, computing platform 112 is coupled to database system 114 which may be configured to store various application data and data associated with webpages served by computing platform 112, and thus may provide local storage for computing platform 112.

Figure 2:
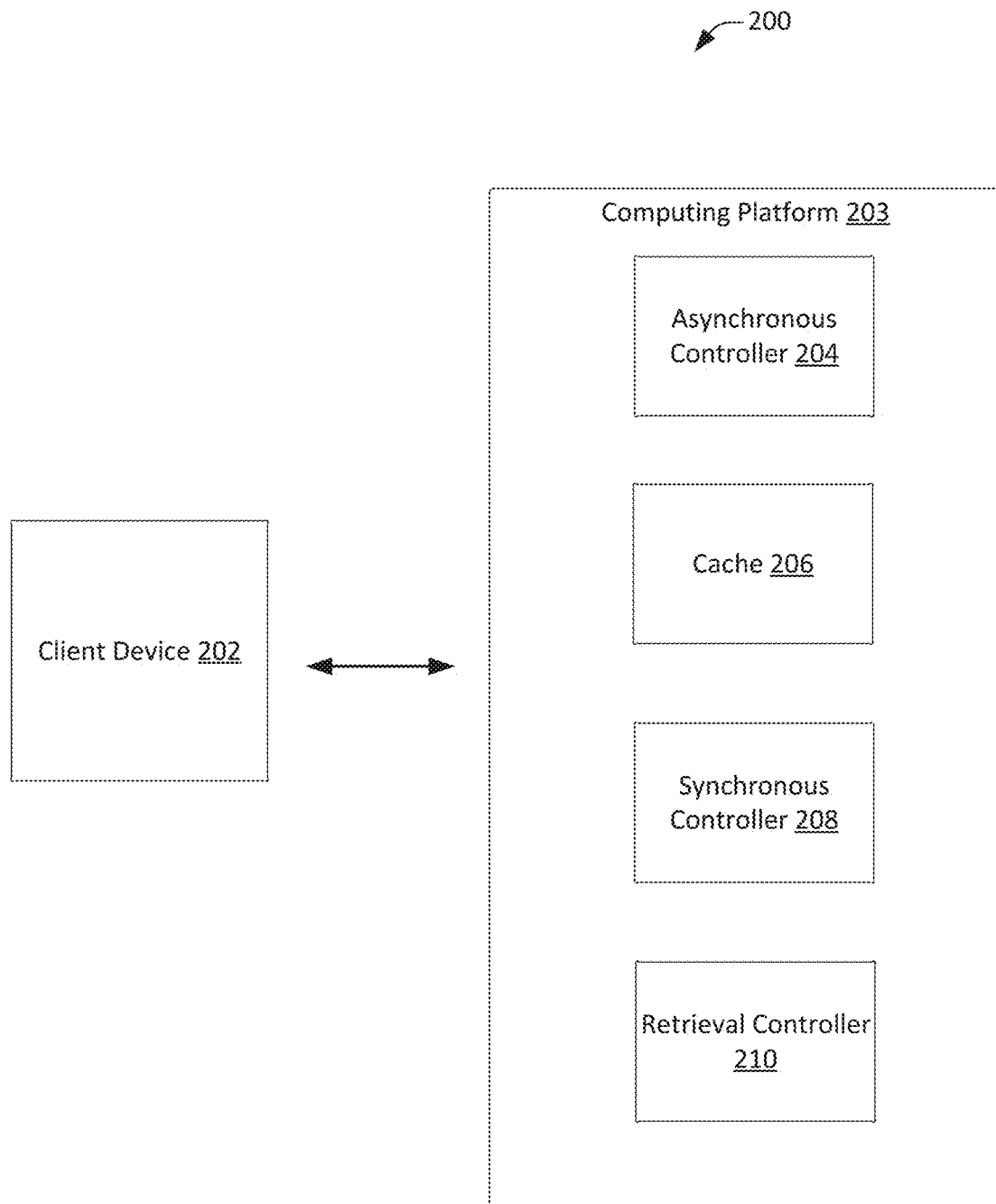
FIG. 2 illustrates an example of a computing platform system, configured in accordance with one or more implementations.

FIG. 2 illustrates an example of a computing platform system, configured in accordance with one or more implementations. As similarly discussed above, a system, such as system 200, may be implemented to manage the usage of application program interfaces (APIs) used to identify and retrieve data objects that may be used in associated with an application, such as one used with an on-demand service. As will be discussed in greater detail below, APIs may have controllers that are configured to utilize asynchronous and synchronous calls when appropriate to enhance and improve latencies associated with content retrieval for an application process flow. In some implementations, a local cache may also be implemented to further reduce latencies.

System 200 may include client device 202 which may be configured to receive an input from a user or other entity. Accordingly, client device 202 may be used to provide inputs to a web interface of an application associated with an on-demand service. Such inputs may be used traverse operational steps of a process flow of such an application. For example, an application may be used to support purchasing functionality for a website. Accordingly, a process flow traversed by a user may include a purchasing decision and transaction that may involve different steps taken by the user as well as usage and retrieval of different data objects associated with each step. In this example, such data objects that may be retrieved may include product information, account information, generation and validation of quotes, as well as processing of payment information. As will be discussed in greater detail below, one or more controllers may be used to manage such retrieval of data objects such that the latency experienced by the user when traversing the process flow is reduced.

Accordingly, system 200 also includes computing platform 203 which is communicatively coupled to client device 202. As shown in FIG. 2, computing platform 203 may include one or more controllers, such as asynchronous controller 204 and synchronous controller 208. As will be discussed in greater detail below with reference to FIGS. 3-5, asynchronous controller 204 may be configured to generate one or more asynchronous calls via an asynchronous API. Moreover, such asynchronous calls may be generated responsive to actions and/or events identified at client device 202. Accordingly, a particular action or event detected at client device 202 may trigger asynchronous controller 204 to generate an asynchronous call to retrieve one or more data objects associated with the detected actions and/or events.

As will also be discussed in greater detail below, synchronous controller 208 may be configured to generate synchronous calls to handle retrieval of data objects when such data objects are requested. Accordingly, data objects not previously retrieved in advance by asynchronous controller 204 may be retrieved by synchronous controller 208. Additional details regarding the management of both asynchronous controller 204 and synchronous controller 208 are discussed in greater detail below with reference to FIGS. 3-5.

Computing platform 203 may further include cache 206 which may be configured to store data objects retrieved by both synchronous and asynchronous calls. Accordingly, data objects that are retrieved may be stored in a local cache, and thus may be made accessible from a storage location that has a lower latency from the perspective of client device 202. In this way, data objects retrieved, for example, in advance by an asynchronous call may be made available to client device 202 from cache 206 which may have a lower latency compared to the data objects original storage location, which may be a separate database system.

In some implementations, cache 206 is configured to support one or more permissions and/or rules that govern access to cached data. More specifically, data that is retrieved and stored in cache 206 may be configured to be accessible based on one or more parameters of a hierarchy of a CRM database system. For example, cached data may be only accessible by a particular user, may be accessible by an entire organization, or may be generally accessible to any user. Accordingly, data cached in response to interactions with one user may be leveraged to also cache such data in a manner accessible to other users that may subsequently use such data. In one example, permissions rules for cached data are determined based on one or more parameters of a user's context within a process flow. For example, if a user is logged into the user's account, the cached data may be specific to that user. If a user is not logged into a specific account, cached data may be made generally accessible. In some implementations, multiple caches may be used to support different levels of access. Accordingly, cache 206 may be implemented as multiple caches where each of a user and an organization may have separate caches. In some implementations, such a configuration of caches may be determined and implemented dynamically based on the user's initiation of a process flow.

In some implementations, data stored in cache 206 is identified based on a cache key. Accordingly, the cache key may be a unique identifier used to identify matching data entries in response to a query. In some implementations, the cache keys used by cache 206 include one or more data values, such as an API name as well as a hash of the parameter values, or any other suitable computed signature. Such parameter values may be the parameters used for the API call. For example, a pre-fetch function using an asynchronous call such as ExchangeRate.Prefetch("USD", "CAD") may include the parameters "USD" and "CAD" used in the query, and also included in the cache key. Moreover, another function, such as ExchangeRate.getResults("USD", "CAD"), may use such parameters to return such cached results.

Computing platform 203 may also be configured to implement a class of functions that is configured to define associations between actions and/or events, and types or classes of data objects. For example, a novel function class may be implemented to handle dual API caching, pre-fetch, and data query operations. More specifically, an entity, such as a developer or administrator, may define one or more interface classes that manage API calls in a manner disclosed herein. In one example, an interface class may identify when to implement separate calls, such as getFirstAPI(Params . . . ) and getSecondAPI(Params . . . ) made to a first and second API. The interface class may also define functions such as Prefetch(Params . . . ) which handles a pre-fetch based on the parameters, and a function getResult( ) which may return a result for a specific data request. In this example, associations between specific calls and prefetched data may be defined based on the parameters underlying the API, and associations between data classes in the data model being queried.

In various implementations, data stored in the cache may be selectively accessible based on one or more features of a user or one or more other features of a data model. For example, a cache key may be appended with an organization identifier to make an entry organization specific. In another example, the cache key could be appended with an organization identifier as well as a user identifier to make the entry organization and user specific. In some implementations, such appending of cache keys is performed by the controllers. Moreover, such features may be configured by an entity, such as a developer or administrator, by creating new interface classes which may have different names, such as OrgDuelApiCaching, UserDuelApiCache, and OrglessDuelApiCaching. In another example, a variable may be set, such as var(ENUM), for each user and/or organization class that is to be included.

Computing platform 203 may also include retrieval controller 210 which may be configured to handle specific data requests that may be made by client device 202 for data objects. Accordingly, retrieval controller 210 may be configured to receive such requests, check to see if the requested data objects are stored in cache 206, and further configured to determine if additional calls should be made to retrieve the requested data objects. For example, if cache 206 does not include a requested data object, retrieval controller 210 may determine whether or not an asynchronous call should be made or whether or not a synchronous call should be made for the requested data object. In this way, retrieval controller may be configured to manage cache 206 as well as usage of the asynchronous API and synchronous API to respond to data object requests made by client device 202.

It will be appreciated that while FIG. 2 illustrates an example of client device 202, it will be appreciated that computing platform 203 may be in communication with any suitable entity. Accordingly, client device 202 may instead be an application server, or may be another computing platform. In this way, any suitable device or computing system may be in communication with computing platform 203, and may trigger asynchronous and synchronous calls as disclosed herein.

Figure 3:
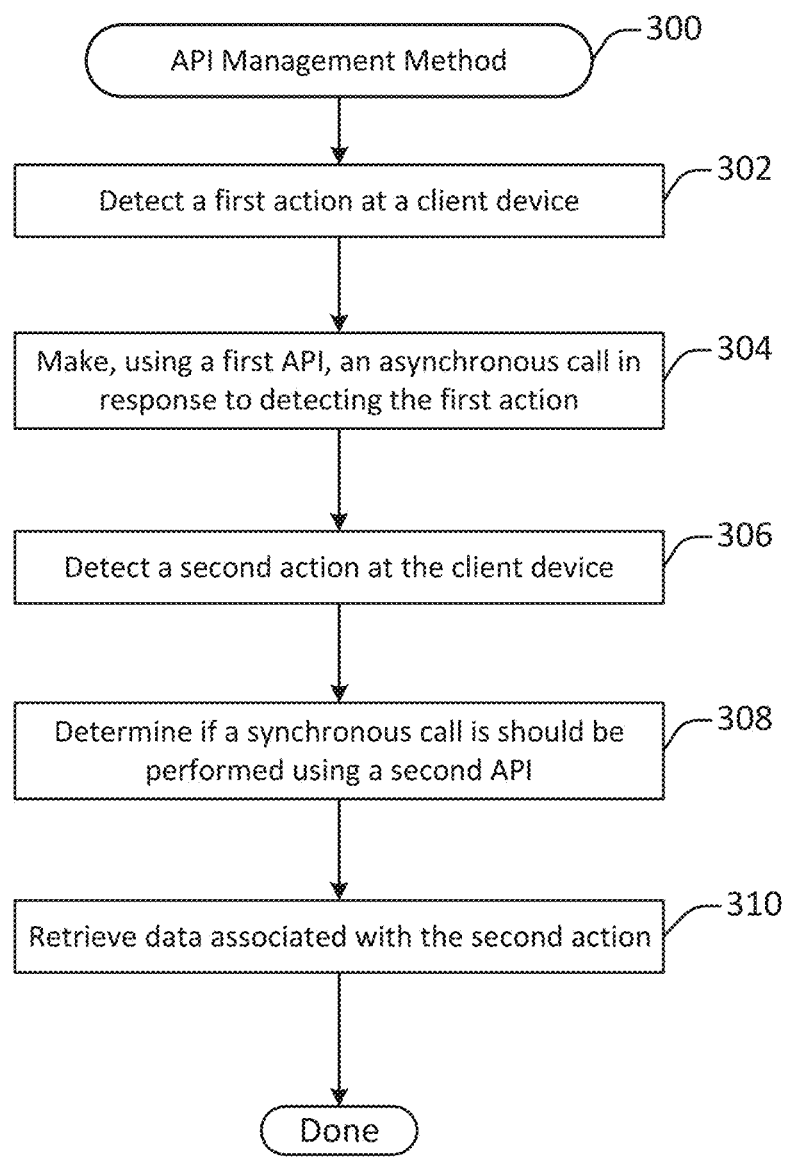
FIG. 3 illustrates an example of a method for application program interface management, performed in accordance with one or more implementations.

FIG. 3 illustrates an example of a method for application program interface management, performed in accordance with one or more implementations. As similarly usage of APIs may be configured such that asynchronous and synchronous calls are managed to enhance and improve latencies associated with content retrieval for an application process flow. In some implementations, a method, such as method 300, may be performed to manage the usage of such APIs.

Method 300 may perform operation 302 during which a first action may be detected at a client device. As similarly discussed above, the first action may be an action taken by a user while traversing a process flow of an application. For example, the first action may include logging into an account, accessing a webpage, or clicking on a particular portion of a webpage, such as a shopping cart. It will be appreciated that the first action may also include various contextual data, such as user account information as well as status or state information identifying, for example, other saved information or configuration data associated with a website.

Method 300 may perform operation 304 during which an asynchronous call may be made in response to detecting the first action. Accordingly, the first action may be detected at the client device and cause an asynchronous controller to initiate an asynchronous call to retrieve one or more data objects from a storage location. As similarly discussed above, the target data objects of the asynchronous call may be identified based on a predetermined set or rules or a mapping, and a result of the asynchronous call may be stored in a cache. In some implementations, the asynchronous controller may receive an explicit request for an API call from the client device, or annotations in a language, such as AspectJ, may be used to identify when an asynchronous call should be made. Thus, in some implementations, annotations in one or more data objects processed by the client device may be used to detect the first action.

Method 300 may perform operation 306 during which a second action may be detected at a client device. Accordingly, as the user continues to traverse a process flow of a website and/or an application, a second action may be detected. Such a second action may include a request for a specific data object. For example, if the second action requires pricing data about a product, the pricing data object may be requested.

Method 300 may perform operation 308 during which it may be determined if a synchronous call should be made. Such a determination may be made based on whether or not the cache includes the requested data object. Accordingly, a retrieval controller may query the cache to see if the requested data object is stored in the cache, as may have been done previously using the asynchronous call. If the requested data object is not stored in the cache, a synchronous call may be used to retrieve it from its storage location.

Method 300 may perform operation 310 during which data associated with the second action may be retrieved. Accordingly, the retrieval controller may return a result to the client device. As noted above, the result may include a result retrieved from the cache, or a result returned from a synchronous call. As will be discussed in greater detail below, if no result if found, an error message or other message may be returned.

Figure 4:
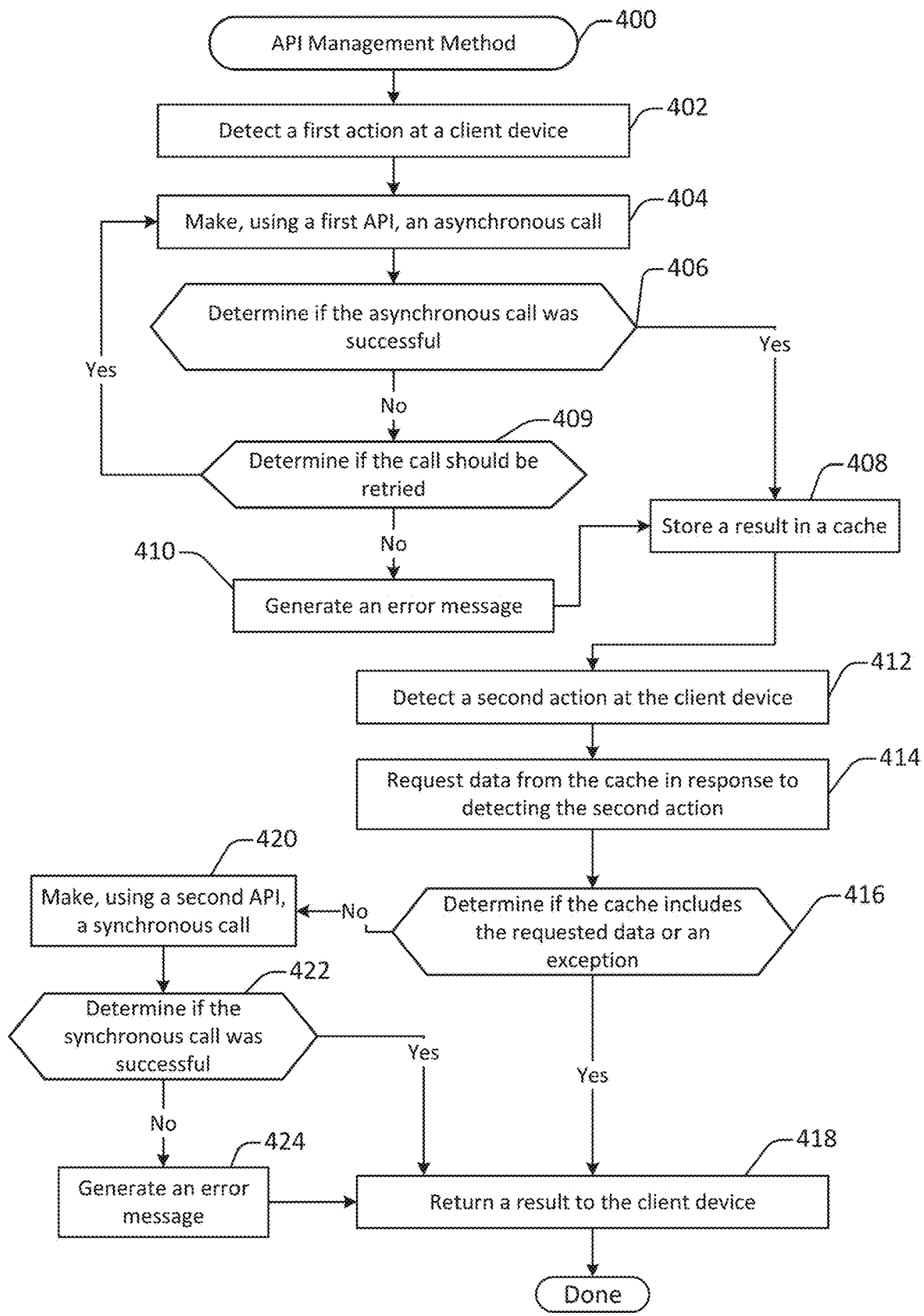
FIG. 4 illustrates an example of a method for application program interface management, performed in accordance with one or more implementations.

FIG. 4 illustrates an example of a method for application program interface management, performed in accordance with one or more implementations. As similarly discussed above, usage of APIs may be configured such that asynchronous and synchronous calls are managed to enhance and improve latencies associated with content retrieval for an application process flow. As will be discussed in greater detail below, a method, such as method 400, may be performed to manage the usage of asynchronous and asynchronous APIs during the application process flow.

Method 400 may perform operation 402 during which a first action may be detected at a client device. As similarly discussed above, the first action may be an action taken by a user while interacting with a component of an on-demand service. For example, the user may be traversing a process flow of an application, or may be navigating webpages of a website. In one example, the user action may be a user clicking on a "subscribe now" button to begin a free trial of the on-demand service. In some implementations, the first action may involve other actions, such as logging into a user's profile with the on-demand service, or clicking on a particular portion of a webpage, such as a shopping cart. In various implementations, the process of checking out when purchasing a product from a website may include various steps within a designated process flow, and traversal of each step may be detected as an action.

Method 400 may perform operation 404 during which an asynchronous call may be made in response to detecting the first action. Accordingly, the first action may be detected at the client device and cause an asynchronous controller to initiate an asynchronous call to retrieve one or more data objects from a storage location. As similarly discussed above, the target data objects of the asynchronous call may be identified based on a predetermined set or rules or a mapping, and a result of the asynchronous call may be stored in a cache. In some implementations, the target data objects may be identified based on one or more aspects of the user, such as a unique identifier associated with the user, as well as user profile information associated with the user that may be stored and maintained by an on-demand service provider. Accordingly, target data objects may include user data, homepage data, organization data, or one or more of various other types of data stored in a database system associated with the on-demand service. Thus, the asynchronous call may be made to a database system of a computing platform of the on-demand service provider.

In some implementations, the asynchronous call may be made after first checking a cache to see if the target data object has already been pre-fetched. Accordingly, during operation 404 an asynchronous controller may first check a storage location within the cache to determine if the target data object has already been pre-fetched and is currently stored within the cache. The asynchronous call may be made in response to determining that the cache does not currently store the target data object.

Method 400 may perform operation 406 during which it may be determined if the asynchronous call was successful. In various implementations, such a determination may be made based on a result of the asynchronous call. More specifically, a successful result may include a result identified as valid. In some implementations, a valid result may include the target data record as well as an indicator identifying a successful response. The valid result may also include an error response identifying one or more missing data fields or invalid data values. An unsuccessful response may include errors or Java exceptions. For example, a timeout exception may be identified as an unsuccessful response. In some implementations, Java exceptions may be identified as valid or successful responses, but timeout expections specifically may be identified as invalid or unsuccessful responses. Accordingly, success of the asynchronous call may be determined based on a validity of the response in addition to or instead of whether or not the target data record was actually retrieved.

In various implementations, if the asynchronous call is not successful, method 400 may proceed to operation 409 during which if may be determined if the asynchronous call should be retried. Accordingly, the asynchronous controller may be configured to retry the asynchronous call a designated number of times, as may be determined by an entity such as an administrator. Thus, such a determination may be made based on designated retry parameters. Accordingly, method 400 may return to operation 404 to retry the asynchronous call. If the retries are not successful, and no valid result is returned after the designated number of retries, it may be determined that the asynchronous call was unsuccessful, and an error message may be generated during operation 410 and stored in a cache. However, if a valid result is returned and the asynchronous call is successful, the result may be stored in cache during operation 408. As similarly discussed above, the cache may have a lower latency, from the perspective of the user and associated client machine, than the database system. Thus, any data returned by the asynchronous call and stored in the cache may be prepared for subsequent usage by the user in the current process flow in which the user is engaged.

Method 400 may perform operation 412 during which a second action may be detected at a client device. Accordingly, as the user continues to traverse the process flow of the website and/or the application, a second action may be detected. Such a second action may include a request for a specific data object. As similarly discussed above, if the second action requires pricing data about a product, the pricing data object may be requested. In some implementations, the data object may be a specific data object from a knowledge database that may be requested responsive to a question made by the user and entered as text into a text field, or provided as any other suitable input to a user interface.

Method 400 may perform operation 414 during which data may be requested from the cache. Accordingly, the request for the data object may be detected, and the cache may be queried based on the identified data object. In some implementations, the data object associated with the second action may have an associated unique identifier within the database system of the on-demand service provider. Accordingly, the unique identifier may be identified and used as the basis of the query of the cache. It will be appreciated that any other suitable identifier may be used as well.

Method 400 may perform operation 416 during which it may be determined whether or not the cache includes the requested data object. Accordingly, the cache may be queried based on one or more identifiers associated with the requested data object, and it may be determined whether or not a match is identified and a result is returned. If it is determined that a match exists, and the cache does include the requested data object, the requested data object may be returned during operation 418. As similarly discussed above, a retrieval controller may return the result to the client device.

Returning to operation 416, if it is determined that the cache does not include the requested data object, method 400 may perform operation 420 during which a synchronous controller may use a synchronous API to make a synchronous call for the requested data object. Accordingly, in response to determining that the cache does not include the requested data object, a synchronous call may be made specifically for that data object to retrieve it from the database system.

Method 400 may perform operation 422 during which it may be determined if the synchronous call was successful. As similarly discussed above, such a determination may be made based on a type of result/response received from the database system. Moreover, as also discussed above, a designated number of retries may be used in case a first try is not successful. Accordingly, if the synchronous call is not successful, then an error message may be generated during operation 424, and may be returned to the client device. If the synchronous call is successful, method 400 may perform operation 424 during which the requested data object may be returned to the client device.

Figure 5:
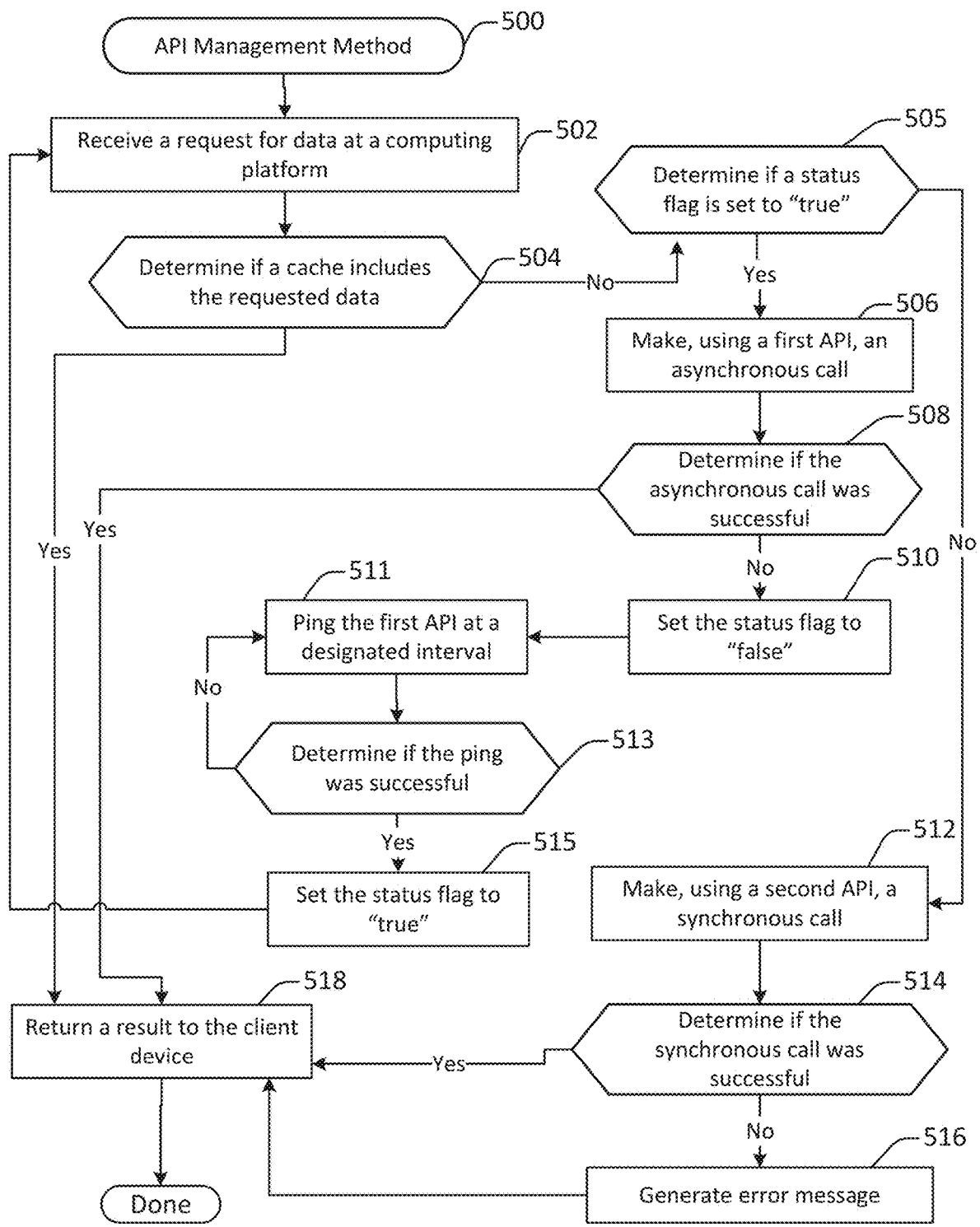
FIG. 5 illustrates an example of a method for application program interface management, performed in accordance with one or more implementations.

FIG. 5 illustrates an example of a method for application program interface management, performed in accordance with one or more implementations. As similarly discussed above, usage of APIs may be configured such that asynchronous and synchronous calls are managed to enhance and improve latencies associated with content retrieval for an application process flow. As will be discussed in greater detail below, a method, such as method 500, may be performed to toggle between different types of APIs and associated calls. In this way, a computing platform may toggle between different APIs, such as a synchronous API and asynchronous API, depending on which API is most effective.

In one example, a computing platform may be migrating between a legacy API backend to a new API backend. During such a transition, in order to ensure reliability of service, some redundancy between APIs may be provided. For example, initial calls may be made to the first API, which may be the new system. If the new system is unstable or fails, the computing platform may fall back to the second API, which may be the old system, with no interruption of service. Moreover, the computing platform may return to the new system and first API when it becomes operational again.

Method 500 may perform operation 502 during which a request may be received. As similarly discussed above, the request may be for a data object stored in a database system of an on-demand service provider. The request may have been generated by a client device in response to a user taking one or more actions, such as traversal of a process flow of an application and/or website.

Method 500 may perform operation 504 during which it may be determined if the requested data is stored in a cache. As similarly discussed above, such a determination may be made based on a query of the cache performed based on one or more identifiers associated with the requested data. More specifically, it may be determined whether or not a match is identified and a result is returned. If it is determined that a match exists, and the cache does include the requested data object, the requested data object may be returned during operation 518. As similarly discussed above, a retrieval controller may return the result to the client device.

Returning to operation 504, if it is determined that the cache does not include the requested data, method 500 may perform operation 505 during which it may be determined if a status flag is set to "true". In some implementations, the status flag is configured to identify whether or not a first API is operating properly and returning valid results. More specifically, the status flag may be configured to identify whether or not asynchronous calls made via the first API are operating properly. In various implementations, the status flag may have been set during a previous iteration of method 500, or by an entity, such as an administrator. The status flag may be stored in a storage location, such as a cache. Accordingly, during operation 505, the status flag may be checked. If the status flag is not set to "true", method 500 may proceed to operation 512 which will be discussed in greater detail below. If the status flag is set to "true", method 500 may proceed to operation 506 during which an asynchronous call may be made. Accordingly, an asynchronous controller may initiate an asynchronous call to retrieve one or more data objects from a storage location. In this way, an asynchronous call and API may be used to retrieve the requested data.

Method 500 may perform operation 508 during which it may be determined if the asynchronous call was successful. As similarly discussed above, such a determination may be made based on a result of the asynchronous call. As also discussed above, the asynchronous controller may be configured to retry the asynchronous call a designated number of times, as may be determined by an entity such as an administrator. If a result is returned and the asynchronous call is successful, the result may be stored in cache and returned as noted above with reference to operation 518.

However, if no valid result is returned, it may be determined that the asynchronous call was unsuccessful, and a notification may be generated and stored in the cache during operation 510. For example, an error message may be stored within the cache. Moreover, the status flag may be set to "false". It will be appreciated that any suitable status identifier may be used and stored within the cache to identify an unsuccessful result and a status of the first API.

Method 500 may proceed to operation 511 during which the first API may be pinged at a designated interval. Accordingly, the first API may be periodically pinged by requests to make asynchronous calls to determine if the first API is operating properly. Thus, during operation 513, a result of the ping may be used to determine if the ping was successful, and the API is operating properly. If the ping was not successful, method 500 may return to operation 511 where another ping may be sent. If the ping was successful, method 500 may proceed to operation 515 where the status flag may be set to "true", and method 500 may return to operation 502 to handle additional requests.

Method 500 may perform operation 512 during which a synchronous controller may use a synchronous API to make a synchronous call for the requested data object. Accordingly, in response to determining that the asynchronous call was unsuccessful, and that the asynchronous controller was not able to retrieve the requested data object, a synchronous call may be made specifically for that data object to retrieve it from the database system.

Method 500 may perform operation 514 during which it may be determined if the synchronous call was successful. As similarly discussed above, such a determination may be made based on a type of result/response received from the database system. Moreover, as also discussed above, a designated number of retries may be used in case a first try is not successful. Accordingly, if the synchronous call is not successful, then an error message may be generated during operation 516 and may be returned to the client device. If the synchronous call is successful, method 500 may perform operation 518, as discussed above, and the requested data object may be returned to the client device.

In this way, a system may be configured to toggle between available APIs to using different types of calls to identify which API is most effective, and to select that API for use. Such ability to toggle between APIs enables the use of legacy techniques when asynchronous calls are not supported. Moreover, it will be appreciated that while FIG. 5 describes two types of controllers and associated APIs, implementations disclosed herein may toggle between any number of controllers and APIs. For example, some implementations may utilize three or four different APIs, and may be configured to toggle between them as similarly discussed above.

Figure 6:
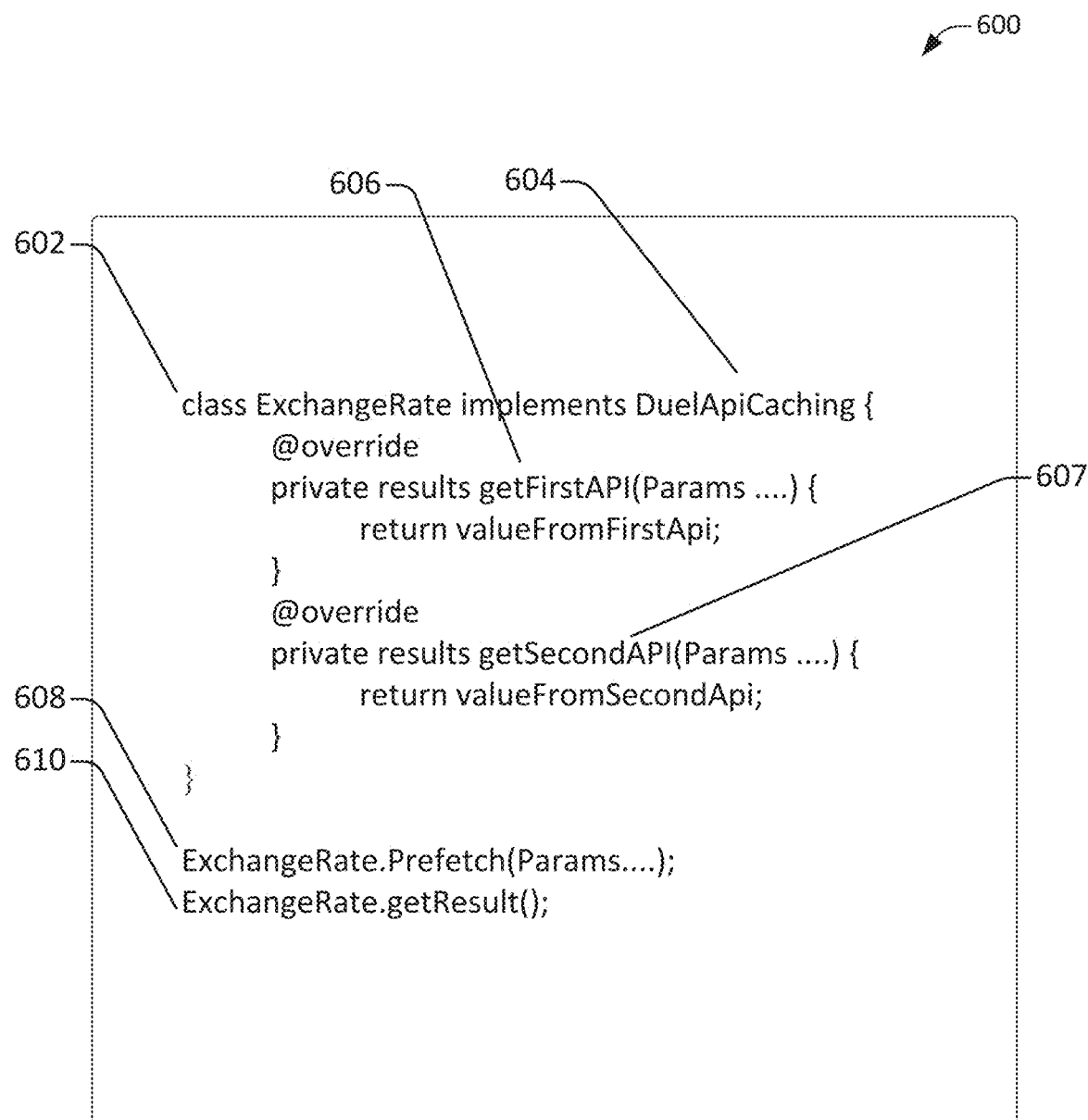
FIG. 6 illustrates a diagram of an example of executable code configured in accordance with some implementations.

FIG. 6 illustrates a diagram of an example of executable code configured in accordance with some implementations. As similarly discussed above, data may be stored in a cache, and such storage of data within the cache may be managed via defined classes of functions and data objects. As also discussed above, a computing platform may be configured to implement classes of functions and data objects that are configured to define associations between actions and/or events, and types or classes of data objects. For example, novel classes may be implemented to handle dual API caching, pre-fetch, and data query operations.

As shown in FIG. 6, an interface class, such as class 602, may be defined to include classes of functions and data objects. More specifically, class 602 may include interface 604 that may call various functions, such as function 606. As similarly discussed above, function 606 may be configured to manage API calls as disclosed herein. In one example, function 606 may include the function getFirstAPI(Params . . . ), and function 607 may include the function getSecondAPI(Params . . . ). In various implementations, other functions, such as function 608 and function 610, may be configured to implement functions such as Prefetch(Params . . . ) and getResult( ). In various implementations, references to "params" may be parameters or any suitable string of variables used to execute a query. Such variables may include specific data values entered into a query by, for example, a user, or may include other variables, such as those defined by dimensions of data included in a data model.

Figure 7:
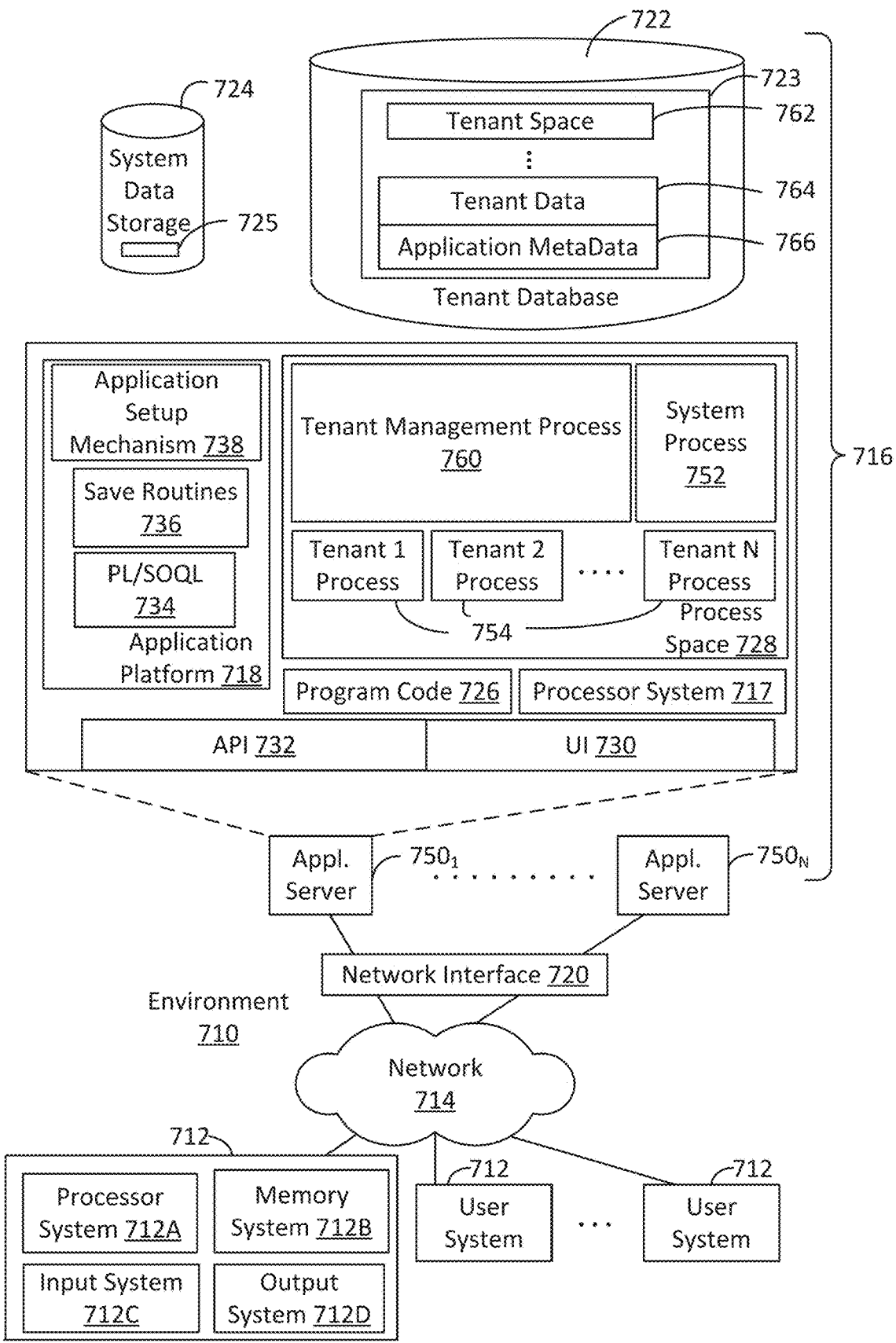
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based API management system. For example, in some implementations, system 716 may include application servers configured to implement and execute on-demand software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a workflow management system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
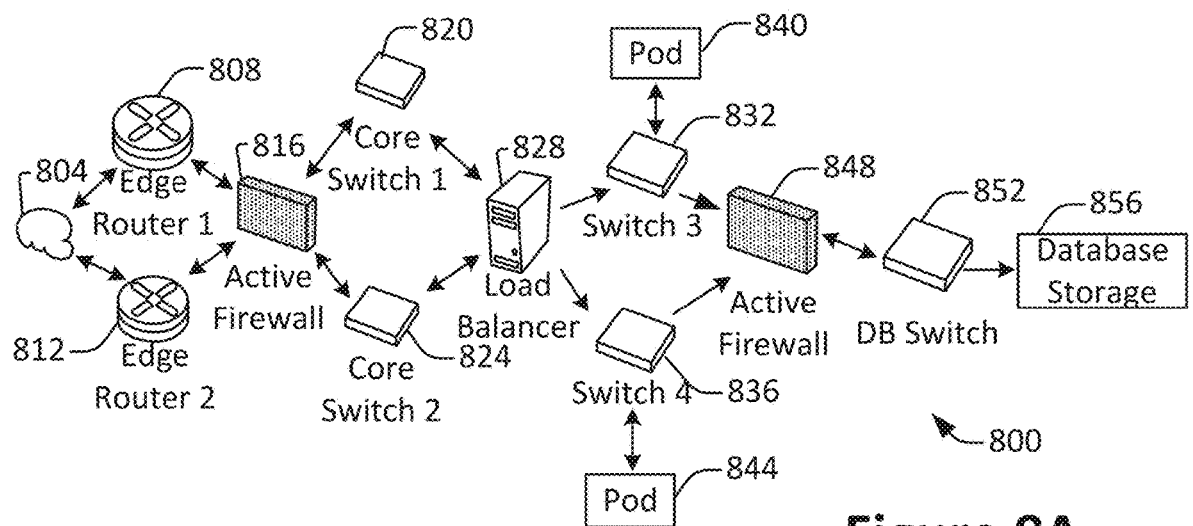
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process user and/or organization information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
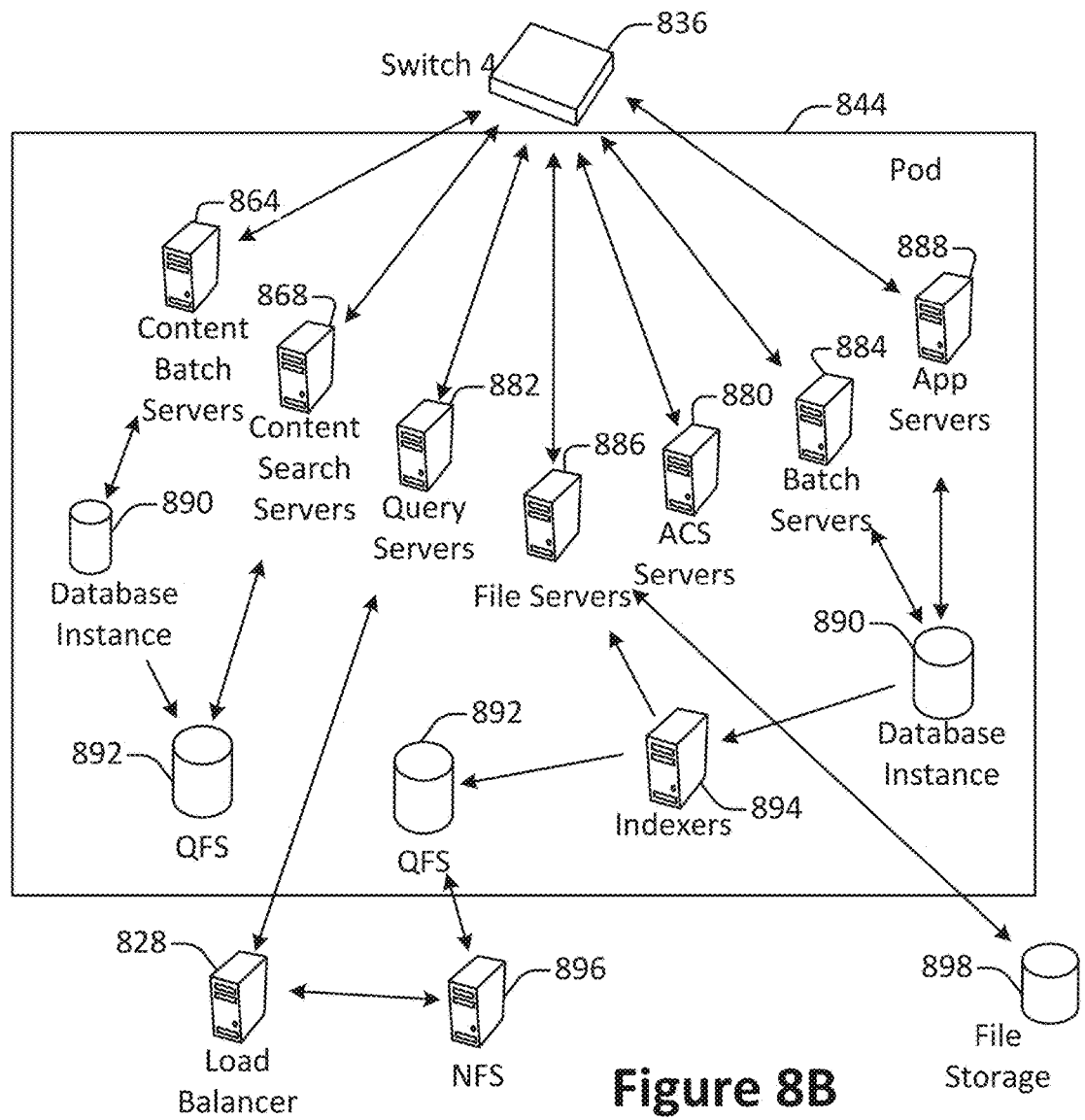
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
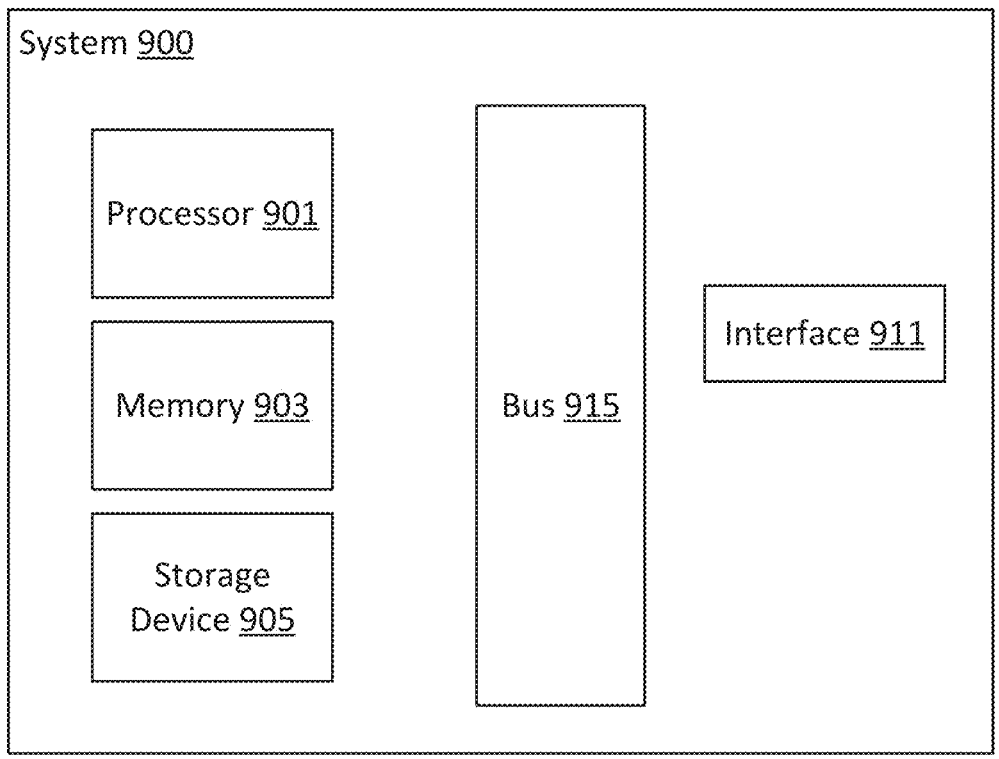
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A computing platform implemented using a server system, the computing platform being configurable to cause:
   detecting a first action comprising an event at a user interface associated with an on-demand application hosted by the computing platform;
   making, using a first application program interface (API), an asynchronous call for a data record in response to detecting the first action, the asynchronous call being made to a storage location of the computing platform;
   detecting a second action associated with the on-demand application;
   determining if a synchronous call should be performed using a second API, the synchronous call being made in response to determining that a cache does not include the data record; and
   generating a result responsive to the second action.

2. The computing platform of claim 1, wherein the asynchronous call is made based on user data stored by the on-demand application for the user.

3. The computing platform of claim 2, wherein the user data comprises user profile information and organization information.

4. The computing platform of claim 1, wherein the determining if a synchronous call should be performed further comprises:
   querying the cache to determine if the cache includes the data record.

5. The computing platform of claim 1, wherein the asynchronous call comprises an asynchronous request for the data record from a database system coupled to the computing platform.

6. The computing platform of claim 5, wherein the synchronous call comprises a synchronous request for the data record from the database system.

7. The computing platform of claim 1, wherein the first action comprises a user logging into a user account.

8. The computing platform of claim 7, wherein the data record comprises activity history associated with the user.

9. The computing platform of claim 1, wherein the computing platform is further configurable to cause:
   generating an error message in response to determining that the synchronous call is not successful.

10. A method comprising:
    detecting a first action comprising an event at a user interface associated with an on-demand application hosted by a computing platform;
    making, using a first application program interface (API), an asynchronous call for a data record in response to detecting the first action, the asynchronous call being made to a storage location of the computing platform;
    detecting a second action associated with the on-demand application;
    determining if a synchronous call should be performed using a second API, the synchronous call being made in response to determining that a cache does not include the data record; and
    generating a result responsive to the second action.

11. The method of claim 10, wherein the asynchronous call is made based on user data stored by the on-demand application for the user.

12. The method of claim 11, wherein the user data comprises user profile information and organization information.

13. The method of claim 10, wherein the determining if a synchronous call should be performed further comprises:
    querying the cache to determine if the cache includes the data record.

14. The method of claim 10, wherein the asynchronous call comprises an asynchronous request for the data record from a database system coupled to the computing platform, and wherein the synchronous call comprises a synchronous request for the data record from the database system.

15. The method of claim 10, wherein the first action comprises a user logging into a user account.

16. The method of claim 15, wherein the data record comprises activity history associated with the user.

17. The method of claim 10 further comprising:
    generating an error message in response to determining that the synchronous call is not successful.

18. A computer program product comprising non-transitory computer-readable program code capable of being executed by one or more processors when retrieved from a non-transitory computer-readable medium, the program code comprising instructions configurable to cause the one or more processors to perform a method comprising:
    detecting a first action comprising an event at a user interface associated with an on-demand application hosted by a computing platform;
    making, using a first application program interface (API), an asynchronous call for a data record in response to detecting the first action, the asynchronous call being made to a storage location of the computing platform;
    detecting a second action associated with the on-demand application;
    determining if a synchronous call should be performed using a second API, the synchronous call being made in response to determining that a cache does not include the data record; and
    generating a result responsive to the second action.

19. The computer program product recited in claim 18, wherein the asynchronous call is made based on user data stored by the on-demand application for the user, and wherein the user data comprises user profile information and organization information.

20. The computer program product recited in claim 18, wherein the asynchronous call comprises an asynchronous request for the data record from a database system coupled to the computing platform, and wherein the synchronous call comprises a synchronous request for the data record from the database system.

* * * * *